US005340961A

United States Patent [19]

[11] Patent Number: 5,340,961

[45] Date of Patent: Aug. 23, 1994

Bebber et al.

[54] PLASMA TORCH FOR TRANSMITTED ARCS

[75] Inventors: Hans J. Bebber, Mülheim; Heinrich-Otto Rossner; Gebhard Tomalla, both of Essen, Fed. Rep. of Germany

[73] Assignee: Mannesmann AG, Düsseldorf, Fed. Rep. of Germany

[21] Appl. No.: 27,741

[22] Filed: Jan. 8, 1993

[30] Foreign Application Priority Data

Jul. 11, 1990 [DE] Fed. Rep. of Germany ....... 4022112

[51] Int. Cl.$^5$ .............................................. B23K 10/00

[52] U.S. Cl. ............................ 219/121.5; 219/121.51; 219/121.48; 219/75; 219/121.59

[58] Field of Search ........... 219/121.5, 121.51, 121.48, 219/121.44, 121.39, 121.59, 121.55, 75, 121.49

[56] References Cited

U.S. PATENT DOCUMENTS 4,670,290 6/1987 Itoh et al. ........................ 219/121.50
4,777,343 10/1988 Goodwin ......................... 219/121.5
5,214,262 5/1993 Carkhuff ......................... 219/121.49
5,216,221 6/1993 Carkhuff .......................... 219/121.5

*Primary Examiner*—Mark H. Paschall
*Attorney, Agent, or Firm*—Thomas N. Ljungman

[57] ABSTRACT

Parasite arcs which occur during the operation of plasma torches have an adverse economic effect and endanger important parts of the torch. Countermeasures of the prior art are only partly effective. Equipping the annular passage between the electrode and the surrounding nozzle which carries the plasma gas with an electrically insulating lining on the inside of the nozzle provides only partial protection. To insulate the segment of the inner wall part of a water-cooled nozzle adjacent to the end wall part by means of insulating parts penetrating the wall part in question from the outer segment is very expensive and complex, depending on the design and the choice of insulation materials. The invention proposes that secondary passages be distributed uniformly between the annular passage for the plasma gas and an annular passage between the nozzle endpiece and the torch casing, uniformly over the circumference. Through these secondary passages, a portion of the plasma gas is diverted and used to cool the nozzle end area and to displace electrically conducting deposits of dusts etc. and plasma arc flashbacks. A flange which is guided so that it slides in this annular passage also acts, by means of relative movements caused by temperature, to prevent the formation of electrical bridges by contaminants.

20 Claims, 1 Drawing Sheet

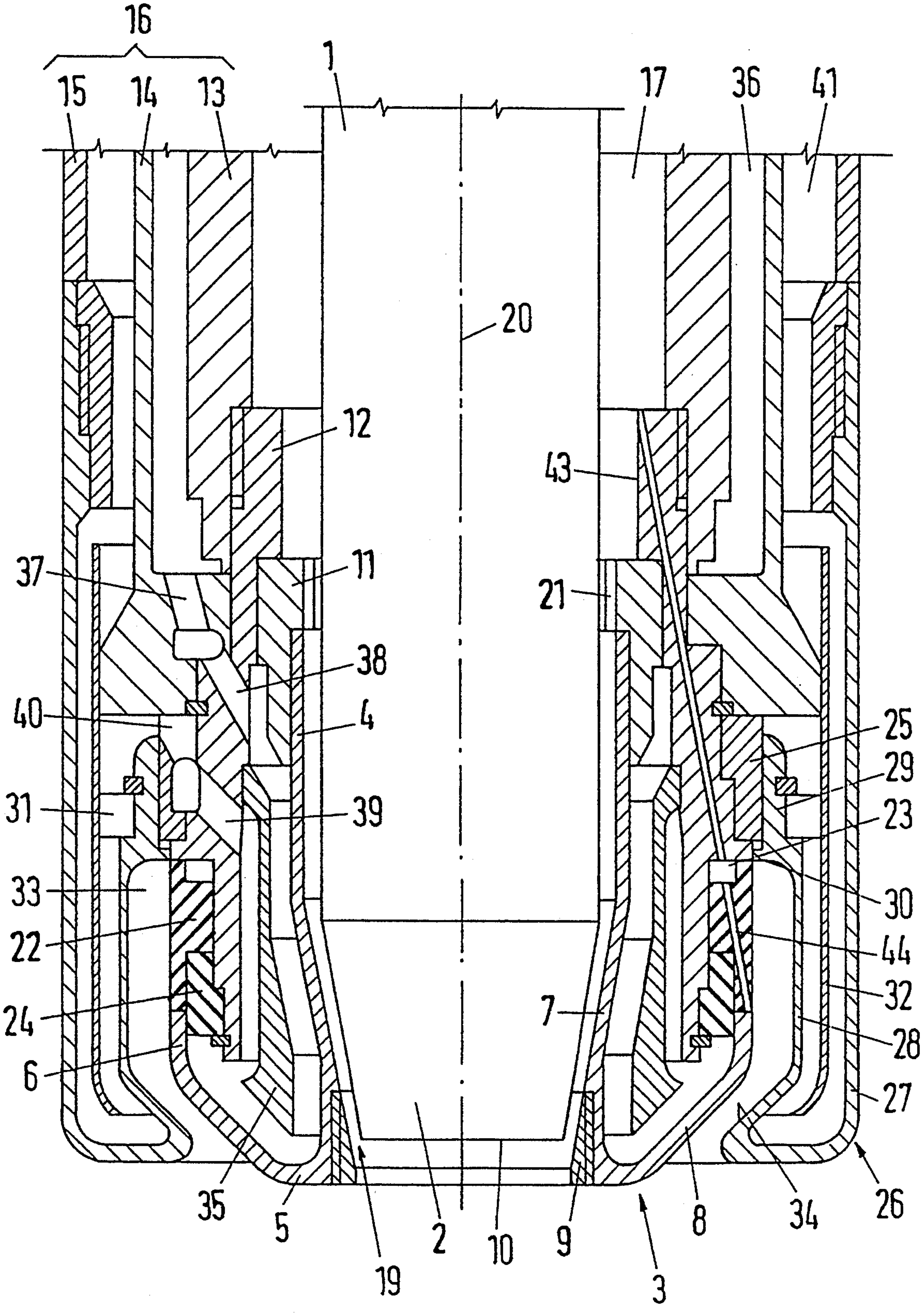
16
15
14
13
1
17
36
41
20
12
43
11
37
21
38
40
4
25
29
31
39
23
33
30
22
44
24
7
32
28
6
27
35
5
19
2
10
9
3
8
34
26

PLASMA TORCH FOR TRANSMITTED ARCS

CROSS REFERENCE TO RELATED APPLICATIONS

This application claims continuation-in-part status under 35 U.S.C. §120, from International Application No. PCT/DE91/00551, filed on Jul. 1, 1991 pending, in which the U.S. was a designated state, which claims priority under 35 U.S.C. §119 from Federal Republic of Germany Patent Application No. P 40 22 112, filed on Jul. 11, 1990.

BACKGROUND OF THE INVENTION

1. Field of the Invention

The present invention relates to a plasma torch for transmitted arcs with a central electrode and a concentric nozzle endpiece. Between the electrode and the nozzle endpiece, there is an annular gap which can be supplied with plasma gas by means of an annular passage. Also, a concentric torch casing is provided, having an outer wall, a middle wall and an inner wall, whereby between the nozzle endpiece and the torch casing, on the end, there is an annular passage, the inner wall of which annular passage is partly formed by a tubular insulation arrangement electrically isolating the two parts. This annular passage can be flushed with plasma gas to clean any contaminants therefrom.

2. Background Information

One essential problem in the operation of plasma torches, in particular when alternating current and three-phase current are used, is the occurrence of parasite arcs which burn, or arc, parallel to the principal arc. In particular, the parasite arcs include the bottom edge of the lower nozzle or torch casing and the outer area of the nozzle or torch end in the current flow. Not only do parasite arcs have an adverse effect on the stability of the arc column, and thus the efficiency and the economy of a plasma torch, or of a system operated with plasma torches, but these parasitic arcs can even lead to the complete destruction of plasma torches.

To prevent parasite arcs, Federal Republic of Germany Patent No. 33 28 777 discloses the addition of an electrically insulating lining in the annular passage between the electrode and the nozzle on the nozzle inside. Having an electrically insulating lining in the annular passage provides only partial protection, since parasite arcs can find a current path outside the insulating lining.

An additional measure to combat parasite arcs is disclosed in Federal Republic of Germany Patent No. 34 35 680. Particularly, as disclosed in this patent, the section of the inside wall of a water-cooled nozzle adjacent to the end wall is electrically insulated from the segment of the end wall adjacent to the outer wall part by two separate insulating parts which penetrate the wall segment in question via the entire cross section surface. However, for very hot furnace atmospheres, it is very difficult to find a suitable insulation material for the end wall of the nozzle.

In a refinement of the theory described immediately above, the insulation provided in the end surface of the nozzle is laid in a groove on the end surface. A plasma torch employing such a refinement has also been realized. The groove on the end side is essentially formed on one side by the outside wall of a nozzle tube or endpiece, and on the other side by a torch casing. The end of the torch casing has a flange pointing toward the axis of the torch to offer a certain degree of thermal protection to the recessed insulation piece. However, if this type of torch is operated in an atmosphere which contains electrically conducting particles, e.g. metal or metallurgical dusts, then the electrically conducting dusts can be deposited on the cooled insulation piece. In such an instance, an electrical bridge can be formed from the nozzle tube to the torch casing, and parasite arcs can flow via the outer edge on the end of the torch casing.

OBJECT OF THE INVENTION

The object of the present invention is to further, i.e. more successfully, limit the danger of the formation of parasite arcs, particularly during operation with alternating current.

SUMMARY OF THE INVENTION

Essentially, this object is achieved in that, between the annular passage for the plasma gas and the annular passage on the end of the plasma torch, there are secondary passages preferably uniformly distributed around the torch. Essentially, through these secondary passages, a portion of the plasma gas is deflected and conducted into the annular passage on the end. The gas flowing through these secondary passages tends to cool the tip or discharge area of the annular passage on the end. Any electrically conducting vapors or dusts which may occur are thus essentially prevented from entering into the passage. In addition, plasma arc flashbacks are essentially prevented, and melt and slag spatters which might otherwise penetrate into the annular passage are generally deflected and cooled. In addition, on account of the cooling action of the gas flowing through the annular passage, a longer service life for coatings located approximately in the tip area of the plasma torch becomes possible. Essentially, overall, there is an increase in the useful life of the plasma torch. Thus, it will be appreciated that, by means of the present invention, because gas flows through the annular passage, the annular passage is effectively flushed of contaminants. The term "contaminants" can be taken here to encompass excessive heat in the annular passage, as well as dust, melt, slag spatters, and the like.

Advantageous refinements of the invention are disclosed hereinbelow. For example, as a result of the penetration of the secondary passages through the tubular insulation arrangement, the deposition of electrically conducting vapors or dusts at the decisive point is essentially prevented.

The tubular insulation arrangement is, preferably, advantageously formed by two rings. One ring preferably faces, and is generally surrounded by, a cooling circuit. Another ring of insulation material, preferably ceramic, and preferably resistant to high temperatures, generally protects the first-mentioned ring of compression-proof insulation material from thermal shock, high temperature gradients and contamination.

The ring of material resistant to high temperatures is preferably mounted with some axial and radial play. Thus, as a result of operational oscillations, this ring can rotate and, thus, also prevent the formation of electrical bridges as a result of the deposit of electrically conducting dusts.

The annular passage on the end is preferably equipped with a tip portion which tapers conically toward the central longitudinal axis of the plasma torch. The open diameter of the outer part of the nozzle forming the passage on the end is preferably smaller on the end than the outside diameter of the tubular insulation arrangement ahead of the conical portion of the annular passage. Essentially, as a result of this preferred configuration of the annular passage, there is special protection for the insulation arrangement against thermal radiation.

The inside wall of the nozzle outer part forming the annular passage on the end preferably has a flange which is guided so that it slides over a nozzle inner part. As a result of the relative movement between the flange and the nozzle inner part when there is an elongation of the nozzle outer part, electrical bridges formed by pollution are also essentially prevented.

The entire inside or outside surface of the annular passage on the end can consist of insulation material or a coating of insulation material.

One aspect of the invention resides broadly in a plasma torch for generating an arc from a plasma gas, the plasma torch having a plasma discharging end for discharging plasma, the plasma gas for being directed towards the plasma discharging end for the formation of the arc, the plasma torch comprising: an outer casing; a nozzle device connected to the outer casing, the nozzle device being disposed at the plasma discharging end of the plasma torch; the nozzle device comprising a nozzle outer part and a nozzle inner part disposed within the nozzle outer part; the nozzle device having a recess indented in the plasma discharging end of the plasma torch between the nozzle outer part and the nozzle inner part, the recess comprising a device for providing a gas filled gap between the nozzle outer part and the nozzle inner part; an electrode device disposed within the nozzle inner part, the electrode device having a forward end at the plasma discharging end of the plasma torch; a device for directing the plasma gas towards the forward end of the electrode device; and a device for providing a gas for flushing at least one contaminant from the recess at least during operation of the plasma torch.

Another aspect of the invention resides broadly in a method of operating a plasma torch for generating an arc from a plasma gas, the plasma torch having a plasma discharging end for discharging plasma, the plasma gas for being directed towards the plasma discharging end for the formation of the arc, the plasma torch comprising: an outer casing; a nozzle device connected to the outer casing, the nozzle device being disposed at the plasma discharging end of the plasma torch; the nozzle device comprising a nozzle outer part and a nozzle inner part disposed within the nozzle outer part; the nozzle device having a recess indented in the plasma discharging end of the plasma torch between the nozzle outer part and the nozzle inner part, the recess comprising a device for providing a gas filled gap between the nozzle outer part and the nozzle inner part; an electrode device disposed within the nozzle inner part, the electrode device having a forward end at the plasma discharging end of the plasma torch; a device for directing the plasma gas towards the forward end of the electrode device; and a device for providing a gas for flushing at least one contaminant from the recess at least during operation of plasma torch; the method of operating comprising the steps of: providing the plasma gas; directing the plasma gas towards the forward end of the electrode device with the device for directing the plasma gas; discharging the plasma gas from the plasma discharging end; forming the arc at the plasma discharging end; flowing the gas into the recess between the nozzle outer part and the nozzle inner part to flush at least one contaminant from the recess; and flushing at least one contaminant from the recess by flowing the gas into the recess.

BRIEF DESCRIPTION OF THE DRAWINGS

One embodiment of the invention is illustrated in longitudinal section in the accompanying drawing, and is described below in greater detail.

DESCRIPTION OF THE PREFERRED EMBODIMENT

A plasma torch according to the present invention preferably has a central electrode 1 with a casing or end surface 2 in the shape of a truncated cone. Preferably, concentrically provided around the electrode is a nozzle tube or endpiece 3 having one each of the following: an inside wall part 4, an end wall part 5 and an outer wall part 6. As shown, of the three wall parts, the inside wall part 4 is preferably disposed closest to the electrode 1, the outer wall part 6 is preferably disposed furthest outwardly from the electrode 1, and the end wall part 5 is preferably disposed between the inner wall part 4 and the outer wall part 6.

As shown, at a lower portion of the plasma torch, the inside wall part 4 preferably has a slightly tapered conical wall segment 7, which wall segment 7 tapers towards a central longitudinal axis 20 of the plasma torch. The generator lines of the conical wall segment 7 of the inside wall part 4 run essentially parallel to the generator lines of the truncated cone-shaped end surface 2 of the electrode 1. Between the end wall part 5 and the outer wall part 6 there is a more conical transitional segment 8. In the vicinity of the tip there is a wear protection ring 9, preferably made of tungsten, bolted into the nozzle tube 3. The end surface of the end wall part 5—viewed in the direction of the arc—projects beyond the plane end surface 10 of the electrode 1.

The inside wall part 4 of the nozzle tube 3 is preferably releasably fastened by means of an external thread to a ring-shaped insulation body 11, which ring-shaped body 11 is preferably made of reinforced high-performance plastic. The ring-shaped body 11 is preferably connected by means of a thread pair to a nozzle inner part 12, which is in turn preferably screwed by means of a thread pair to an inner tube 13 of a torch casing 16. Essentially, the axial position of the nozzle tube 3 is therefore defined by the ring-shaped body 11, the nozzle inner part 12 and the inner tube 13.

The torch casing inner tube 13 is preferably connected by means of its upper end with a pipe joint (not shown), by which a middle or center tube 14 and an outer tube 15 of the torch casing 16 are also preferably held.

The inner tube 13 and the electrode 1 preferably form a ring-shaped passage 17 for plasma gas, which passage makes a transition into an annular passage or passage section 19 between the electrode 1 and the nozzle tube 3. In the transition area between passage 17 and passage 19, the ring-shaped insulation body 11 is equipped with penetrations 21 running parallel to the torch axis 20. More particularly, a ring-shaped, or annular, passage is preferably formed along the extent of electrode 1 to allow the flow of plasma gas essentially along the extent of electrode 1. Preferably the electrode 1 forms the inner wall of the annular passage, and the torch casing inner tube 13, the nozzle inner part 12 and the inside wall part 4 form the outer wall of the annular passage. As shown in the drawing, the annular passage has essentially two sections, namely passage 17 and passage 19. The outer wall of passage 17 is preferably formed by the torch casing inner tube 13 and the nozzle inner part 12. The outer wall of passage 19 is preferably formed by the inside wall part 4. Passage 19 extends towards the end surface 2 of electrode 1. As shown, the insulating ring-shaped body 11 essentially separates passage 17 from passage 19 to interrupt the greater annular passage extending along the entire electrode 1. However, communication between passages 17 and 19 is preferably provided by the penetrations 21 extending through the insulating ring-shaped body 11 to create, along with passages 17 and 19, a continuous effective passage for the flow of plasma gas along the extent of electrode 1, without unduly sacrificing the insulating function of ring-shaped body 11. Penetrations 21 are preferably of a suitable number to ensure sufficient flow of plasma gas along electrode 1 and may, preferably, be distributed at generally equal intervals about electrode 1.

On the lower end of the nozzle inner part 12, the nozzle inner part 12 preferably has a recess open toward the outside, which recess contains: an insulation ring 22, preferably made of a material resistant to high temperature and thermal shock, preferably a ceramic; and a lower insulation ring 24, which is preferably made of a hydraulically sealed material, preferably a ceramic. The insulation ring 22, which is resistant to high temperatures, has a circular recess 23 facing the passage 17, and is preferably mounted with axial and radial play, so that the insulation ring 22 is not held stationary, but can rotate. With a portion of the nozzle inner part 12 and the outer wall part 6 of the nozzle tube 3, the insulation ring 22 forms a common outside surface. The hydraulically sealed insulation ring 24 extends from the nozzle inner part 12 to the inside of the outer wall part 6 of the nozzle tube 3. Around the nozzle inner part 12 there is preferably a ring-shaped metal body 25 which has a cylindrical outer surface which is somewhat larger than the common outer surface of the insulation ring 22 and of the nozzle tube 3. Preferably, the center tube 14 is connected at its lower end in a pressure-tight manner to the nozzle inner part 12, and has a partly cylindrical outer surface, the diameter of which surface is in turn generally larger than that of the outer surface of the ring-shaped body 25. Preferably screwed onto the outer tube 15 is a nozzle outer part 26, which may comprise an outer nozzle casing 27 and an inner wall 28. The inner wall 28 is preferably guided so that the inner wall 28 slides in a pressure-tight manner by means of a flange 29 on the ring-shaped body 25. The flange 29 preferably has a ring-shaped projection 30 directed toward the torch axis 20, which ring-shaped projection 30 may slide on the common outer surface of the nozzle inner part 12 and of the insulation ring 22. A middle or deflection wall 32 of the nozzle outer part 26 is also preferably held on the flange 29 by means of a spacer 31. The middle wall 32 is guided so that the middle wall 32 slides in a pressure-tight manner on the bottom cylindrical surface of the torch casing middle tube 14. The outer wall part 6 of the nozzle tube 3, the insulation ring 22 resistant to high temperatures, the flange 29 and the inner wall 28 of the nozzle outer part 26 form an annular passage 33 which is closed at the back end and is open at the front end. As a result of the oblique wall segment 8 of the nozzle tube 3 and a conical segment 34 of the inner wall 28, the annular passage 33 has a profile which is conical toward the end, and is directed toward the axis 20 of the plasma torch.

Finally, a deflector part 35 for a coolant circuit is attached to the nozzle inner part 12. Preferably, water is used as a coolant for a plasma torch according to the present invention. The coolant flows through an annular passage 36 formed by the torch casing inner tube 13 and the torch casing middle tube 14 to passage segments 37, 38 distributed uniformly over the circumference, which are routed through the lower portion of the torch casing middle tube 14 and the nozzle inner part 12 respectively. The coolant then flows through an annular passage formed by the inner wall part 4 of the nozzle tube 3 and the deflector part 35, is deflected by the deflector part 35, travels upward between the deflector part 35 and the nozzle inner part 12, enters through passage segments 39, 40, which are routed through the nozzle inner part 12 and the ring-shaped body 25 respectively, into the nozzle outer part 26. In the nozzle outer part 26, the coolant first flows between the inner wall 28 and the deflector wall 32, is deflected by the latter, and flows through the annular passage 41 formed by the middle tube 14 and the outer tube 15 back to the exit. The torch casing 16 with the nozzle outer part 26 and the nozzle tube 3 therefore have a common coolant circuit.

In other words, the coolant circuit is preferably as follows. From a coolant source, the coolant preferably enters through the annular passage 36 between the torch casing inner tube 13 and the torch casing middle tube 14. Preferably the coolant then flows through the passage segments 37. The passage segments 37 are formed in the lower portion of the torch casing middle tube 14, and preferably are distributed uniformly over the circumference of the torch. Preferably the coolant then flows through the passage segments 38. The passage segments 38 are formed in the nozzle inner part 12, and preferably are distributed uniformly over the circumference of the torch. Preferably the coolant then flows through an annular passage between the inner wall part 4 of the nozzle tube 3 and the deflector part 35. Preferably the deflector part 35 is attached to the nozzle inner part 12 below the passage segments 38. Preferably the coolant then flows between the end wall part 5 of the nozzle tube 3 and the deflector part 35. The coolant may be deflected by the end wall part 5. Preferably the coolant then flows between the conical transitional segment 8 of the nozzle tube 3 and the deflector part 35. Preferably the coolant then flows upward between the deflector part 35 and lower end of the nozzle inner part 12. Preferably the coolant then flows through the passage segments 39. The passage segments 39 are formed in the nozzle inner part 12, and preferably are distributed uniformly over the circumference of the torch. Preferably the coolant then flows through the passage segments 40. The passage segments 40 are formed in the ring-shaped body 25, and preferably are distributed uniformly over the circumference of the torch. The coolant preferably enters the nozzle outer part 26 from the passage segments 40. In the nozzle outer part 26, the coolant preferably first flows between the inner wall 28 and the deflector wall 32. Preferably the coolant is then deflected by the deflector wall 32. Preferably the coolant then flows between the outer nozzle casing 27 and the deflector wall 32. Preferably the coolant then exits through the annular passage 41 between the middle tube 14 and the outer tube 15. Therefore, the coolant circuit preferably passes through both the torch casing 16 with the nozzle outer part 26 and the nozzle tube 3.

The passage segments 37, 38, 39, 40 run in respective radial section planes distributed uniformly over the entire circumference. Through radial section planes which are different from the above, a passage segment and a hole 43 respectively are routed through the nozzle inner part 12, and lead from the main annular passage 17 to the circular recess 23 of the insulation ring 22. In addition, the insulation ring 22, which is resistant to high temperatures, is penetrated by holes or passage segments 44, which lead from the circular recess 23 to the outer surface of the insulation ring 22 and thus to the annular passage 33 on the end. Overall, therefore, there is a secondary passage or a pneumatic line connection from the main gas passage 17 to the annular passage 33 on the end. This secondary passage is used, according to the present invention, for flushing plasma gas into the annular passage 33 to cool the tip or discharge area and prevent vapors and dusts from entering into the annular passage 33. Parasitic arcs can thus essentially be eliminated or at least minimized.

In other words, there may be one or more passage segments 43 leading from the annular passage 17 to the circular recess 23. Preferably there is more than one passage segment 44 leading from the circular recess 23 to the annular passage 33. The passage segments 44 are preferably uniformly distributed around the circumference of the annular passage 33. The one or more passage segments 43 are located such that the one or more passage segments 43 do not interfere with the passage segments 37, 38, 39, 40.

One feature of the invention resides broadly in a plasma torch for transmitted arcs with a central electrode, a concentric nozzle endpiece, whereby between the electrode and the nozzle endpiece there is an annular gap which can be supplied with plasma gas by means of an annular passage, and a concentric torch casing having an outer, middle and inner wall, whereby between the nozzle endpiece and the torch casing, on the end, there is an annular passage whose inner wall is partly fortified by a tubular insulation arrangement electrically isolating the two parts, characterized by the fact that between the annular passage 17 for the plasma gas and the annular passage 33 on the end, there are secondary passages 43, 44 uniformly distributed over the circumference.

Another feature of the invention resides broadly in a plasma torch, characterized by the fact that the secondary passages 43, 44 enter the passage 33 on the end through the tubular insulation arrangement 22, 24.

Yet another feature of the invention resides broadly in a plasma torch, characterized by the fact that the ring-shaped insulation arrangement 22, 24 consists of a ring 24 made of pressure-tight insulation material surrounded by a cooling circuit, and a ring 22 made of material resistant to high temperature forming a portion of the wall of the annular passage 33 on the end, and the secondary passages 43, 44 enter the passage 33 on the end through the ring 22 which is resistant to high temperatures.

Another feature of the invention resides broadly in a plasma torch, characterized by the fact that the ring 22 forming one part of the wall of the annular passage 33 on the end is made of refractory material resistant to high temperature and is mounted with axial and radial play.

Yet another feature of the invention resides broadly in a plasma torch, characterized by the fact that the annular passage 33 on the end has a tip area which can converge toward the torch axis 20, and the open diameter of the nozzle outer part 26, 28, 34 forming the passage 33 on the end is smaller on the end surface than the outside diameter of the tubular insulation arrangement 22, 24.

Another feature of the invention resides broadly in a plasma torch, characterized by the fact that the inside wall 28 of the nozzle outer part 26 forming the annular passage 33 on the end has a flange 29 guided so that it slides on a nozzle inner part 12, 25.

Yet another feature of the invention resides broadly in a plasma torch, characterized by the fact that the entire inner and/or outer surface of the annular passage 33 on the end consists of insulation material or has a coating of insulation material.

Plasma torches are described in U.S. Pat. No. 4,954,688, entitled "Plasma Arc Cutting Torch Having Extended Lower Nozzle Member", issued Sep. 4, 1990; U.S. Pat. No. 5,013,885, entitled "Plasma Arc Torch Having Extended Nozzle of Substantially Hourglass", issued May 7, 1991; and U.S. Pat. No. 5,045,667, entitled "Manual Keyhole Plasma Arc Welding System", issued Sep. 3, 1991. These patents are hereby incorporated by reference as if set forth in their entirety herein.

All, or substantially all, of the components and methods of the various embodiments may be used in any combination with at least one embodiment or all of the embodiments, if any, described herein.

All of the patents, patent applications and publications recited herein and in the attached declaration, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

We claim:

1. A plasma torch for generating an arc from a plasma gas, said plasma torch having a plasma discharging end for discharging plasma, the plasma gas for being directed towards the plasma discharging end for the formation of the arc, said plasma torch comprising:

an outer casing;

nozzle means connected to said outer casing, said nozzle means being disposed at the plasma discharging end of said plasma torch;

said nozzle means comprising a nozzle outer part and a nozzle inner part disposed within said nozzle outer part;

said nozzle means having a recess indented in the plasma discharging end of said plasma torch between said nozzle outer part and said nozzle inner part, said recess comprising means for providing a gas filled gap between said nozzle outer part and said nozzle inner part;

electrode means disposed within said nozzle inner part, said electrode means having a forward end at the plasma discharging end of said plasma torch;

means for directing the plasma gas towards the forward end of said electrode means;

means for providing a gas for flushing at least one contaminant from said recess at least during operation of said plasma torch;

said plasma torch comprising a discharge opening at said plasma discharging end, said discharge opening being configured for the discharge of plasma gas therethrough;

said discharge opening having a diameter;

said plasma torch having a longitudinal axis;

said forward end of said electrode means being displaced from said discharge opening by a first distance, said first distance being defined parallel to said longitudinal axis;

said first distance being substantially no greater than the diameter of said discharge opening;

said recess having a discharge end for the discharge of plasma gas therethrough, said discharge end being defined between said nozzle outer part and said nozzle inner part;

said discharge end of said recess being displaced from said discharge opening by a second distance to permit said nozzle inner part to extend past said discharge end of said recess, said second distance being defined parallel to said longitudinal axis;

said second distance being substantially no greater than the diameter of said discharge opening.

2. The plasma torch according to claim 1, wherein said first distance is substantially less than the diameter of said discharge opening.

3. The plasma torch according to claim 2, wherein said second distance is substantially less than the diameter of said discharge opening.

4. The plasma torch according to claim 3, wherein:

said recess is an annular recess disposed coaxially with respect to said longitudinal axis; and said recess is disposed completely around said nozzle inner part.

5. The plasma torch for generating an arc from a plasma gas according to claim 4, wherein said means for providing a gas comprises at least one secondary passage connecting said means for directing the plasma gas to said recess.

6. The plasma torch for generating an arc from a plasma gas according to claim 5, wherein:

said outer casing comprises an inner wall;

said means for directing the plasma gas comprises a first annular gap between said electrode means and said inner wall of said outer casing; and said recess is in communication with said first annular gap through said at least one secondary passage.

7. The plasma torch for generating an arc from a plasma gas according to claim 6, wherein:

said nozzle inner part comprises:

a nozzle tube; and insulation means for electrically insulating said outer casing from said nozzle tube;

said nozzle inner part has an outer wall disposed towards said nozzle outer part;

said insulation means forms a portion of said outer wall of said nozzle inner part; and said at least one secondary passage opens into said recess through said insulation means.

8. The plasma torch for generating an arc from a plasma gas according to claim 7, wherein:

said insulation means comprises a first insulation body composed of pressure-tight insulation material and a second insulation body composed of refractory material resistant to high temperature;

said second insulation body forms said portion of said outer wall of said nozzle inner part; and said at least one secondary passage opens into said recess through said second insulation body.

9. The plasma torch for generating an arc from a plasma gas according to claim 8, wherein:

said at least one secondary passage comprises at least one first secondary passage segment and a plurality of second secondary passage segments;

said at least one first secondary passage segment is disposed in communication with said first annular passage;

said plurality of second secondary passage segments are disposed in communication with said recess;

each of said plurality of second secondary passage segments is in communication with at least one of said at least one first secondary passage segment; and said plurality of second secondary passage segments are uniformly distributed around said longitudinal axis of said plasma torch.

10. The plasma torch for generating an arc from a plasma gas according to claim 9, wherein said second insulation body is mounted with axial and radial play.

11. The plasma torch for generating an arc from a plasma gas according to claim 10, wherein:

said means for directing the plasma gas comprises a second annular gap disposed between said electrode means and said nozzle tube;

said second annular gap is disposed between said first annular gap and said forward end of said electrode means; and said second annular gap is in communication with said first annular gap to direct the plasma gas toward the plasma discharging end.

12. The plasma torch for generating an arc from a plasma gas according to claim 11, wherein:

said plasma torch further comprises a cooling circuit, said cooling circuit being disposed within each of said nozzle inner part and said nozzle outer part for passage of a coolant liquid through each of said nozzle inner part and said nozzle outer part; and said first insulation body is substantially surrounded by said cooling circuit.

13. The plasma torch for generating an arc from a plasma gas according to claim 12, wherein:

said outer casing further comprises an outer wall and a middle wall; and said nozzle outer part comprises an outer wall, a middle wall and an inner wall, said inner wall of said nozzle outer part being disposed towards said outer wall of said nozzle inner part.

14. The plasma torch for generating an arc from a plasma gas according to claim 13, wherein:

said recess is disposed between said inner wall of said nozzle outer part and said outer wall of said nozzle inner part;

said recess is annular;

said recess is concentric about said longitudinal axis of said plasma torch;

said recess has a cylindrical portion and a conical portion;

said conical portion of said recess extends between said cylindrical portion of said recess and said plasma discharging end of said plasma torch, said conical portion of said recess having a first end adjacent to said cylindrical portion of said recess and a second end at said plasma discharging end of said plasma torch;

said second end of said conical portion of said recess is disposed closer to said longitudinal axis of said plasma torch than said first end of said conical portion of said recess;

said portion of said outer wall of said nozzle inner part has a first diameter;

said inner wall of said nozzle outer part has a second diameter at said second end of said conical portion of said recess; and said first diameter is greater than said second diameter.

15. The plasma torch for generating an arc from a plasma gas according to claim 14, wherein said inner wall of said nozzle outer part comprises a flange, said flange being configured to slide on said nozzle inner part.

16. The plasma torch for generating an arc from a plasma gas according to claim 15, wherein at least one of:

said outer wall of said nozzle inner part, and said inner wall of said nozzle outer part, comprises one of:

a coating of insulation material for providing electrical and thermal insulation, and insulation material for providing electrical and thermal insulation.

17. The plasma torch for generating an arc from a plasma gas according to claim 16, wherein:

said electrode means, said nozzle means and said outer casing are concentric;

said at least one secondary passage comprises a plurality of secondary passages;

said plurality of secondary passages are uniformly distributed around said longitudinal axis; and said plurality of secondary passages are disposed in said nozzle inner part.

18. A method of operating a plasma torch for generating an arc from a plasma gas, the plasma torch having a plasma discharging end for discharging plasma, the plasma gas for being directed towards the plasma discharging end for the formation of the arc, the plasma torch having a longitudinal axis, the plasma torch comprising: an outer casing; nozzle means connected to the outer casing, the nozzle means being disposed at the plasma discharging end of the plasma torch; the nozzle means comprising a nozzle outer part nd a nozzle inner part disposed within the nozzle outer part; the nozzle means having a recess indented in the plasma discharging end of the plasma torch between the nozzle outer part and the nozzle inner part, the recess comprising means for providing a gas filled gap between the nozzle outer part and the nozzle inner part; electrode means disposed within the nozzle inner part, the electrode means having a forward end at the plasma discharging end of the plasma torch; means for directing the plasma gas towards the forward end of the electrode means; and means for providing a gas for flushing at least one contaminant from the recess at least during operation of plasma torch; said method of operating comprising the steps of:

providing a discharge opening at the plasma discharging end, the said discharge opening being configured for the discharge of plasma gas therethrough, the discharge opening having a diameter;

configuring the forward end of the electrode means to be displaced from the discharge opening by a first distance, the first distance being defined parallel to the longitudinal axis, the first distance being substantially no greater than the diameter of the discharge opening;

configuring the recess to have a discharge end for the discharge of plasma gas therethrough, the discharge end being defined between the nozzle outer part and the nozzle inner part;

configuring the discharge end of the recess to be displaced from the discharge opening by a second distance to permit the nozzle inner part to extend past the discharge end of the recess, the second distance being defined parallel to the longitudinal axis, the second distance being substantially no greater than the diameter of the discharge opening;

providing the plasma gas;

directing the plasma gas towards the forward end of the electrode means with the means for directing the plasma gas;

discharging the plasma gas from the plasma discharging end;

forming the arc at the plasma discharging end;

flowing the gas into the recess between the nozzle outer part and the nozzle inner part to flush at least one contaminant from the recess; and flushing at least one contaminant from the recess by flowing the gas into the recess.

19. A method of operating a plasma torch for generating an arc from a plasma gas according to claim 18, wherein:

said directing comprises directing the plasma gas through a first annular gap between the electrode means and the outer casing; and said flowing comprises flowing the gas from the first annular gap to the recess through at least one secondary passage in communication with the first annular gap and the recess.

20. A method of operating a plasma torch for generating an arc from a plasma gas according to claim 19, wherein:

the plasma torch further comprises an insulation body composed of refractory material resistant to high temperature, the insulation body comprising a portion of the at least one secondary passage, the at least one secondary passage opening into the recess through the insulation body;

said flowing comprises flowing the gas from the first annular gap to the recess through the insulation body via the at least one secondary passage; and said method of operating further comprises the step of cooling the plasma torch, said cooling comprising circulating a coolant through a cooling circuit in the plasma torch.

* * * * *

UNITED STATES PATENT AND TRADEMARK OFFICE

CERTIFICATE OF CORRECTION

PATENT NO. : 5,340,961

DATED : August 23, 1994

INVENTOR(S) : Hans J. BEBBER, Heinrich-Otto ROSSNER and Gebhard TOMALLA

It is certified that error appears in the above-indentified patent and that said Letters Patent is hereby corrected as shown below:

column 7, line 42, after 'partly', delete "fortified" and insert --formed--.

column 11, line 55, Claim 18, after 'part', delete "nd" and insert --and--.

Signed and Sealed this

Eighth Day of October, 1996

Attest:

BRUCE LEHMAN

*Attesting Officer* *Commissioner of Patents and Trademarks*